(12) United States Patent
Kunisada

(10) Patent No.: US 7,523,402 B2
(45) Date of Patent: Apr. 21, 2009

(54) INFORMATION PROCESSING APPARATUS, A DISPLAY CONTROL METHOD OF THE INFORMATION PROCESSING APPARATUS, A STORAGE MEDIUM AND ITS PROGRAM PERFORMING A PLURAL WINDOW DISPLAY

(75) Inventor: Haruyuki Kunisada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 10/644,006

(22) Filed: Aug. 20, 2003

(65) Prior Publication Data

US 2004/0080539 A1 Apr. 29, 2004

Related U.S. Application Data

(63) Continuation of application No. PCT/JP01/01324, filed on Feb. 22, 2001.

(51) Int. Cl.
*G06F 3/00* (2006.01)
(52) U.S. Cl. .................................. 715/761; 715/781
(58) Field of Classification Search ............. 715/781, 715/810, 761; 345/1.1
See application file for complete search history.

(56) References Cited

U.S. PATENT DOCUMENTS

| | | | | |
|---|---|---|---|---|
| 5,121,477 A | * | 6/1992 | Koopmans et al. | 715/762 |
| 5,625,783 A | * | 4/1997 | Ezekiel et al. | 719/320 |
| 5,754,175 A | * | 5/1998 | Koppolu et al. | 715/744 |
| 5,757,371 A | * | 5/1998 | Oran et al. | 715/779 |
| 5,771,032 A | | 6/1998 | Cline et al. | 715/786 |
| 6,011,551 A | * | 1/2000 | Amro | 715/788 |
| 6,037,934 A | * | 3/2000 | Himmel et al. | 715/760 |
| 6,957,395 B1 | * | 10/2005 | Jobs et al. | 715/765 |
| 7,107,548 B2 | * | 9/2006 | Shafron | 715/826 |
| 7,134,094 B2 | * | 11/2006 | Stabb et al. | 715/827 |
| 2005/0091610 A1 | * | 4/2005 | Frei et al. | 715/804 |
| 2005/0273729 A1 | * | 12/2005 | Kumashio | 715/825 |

FOREIGN PATENT DOCUMENTS

| | | |
|---|---|---|
| JP | 5-181440 | 7/1993 |
| JP | 6-095833 | 4/1994 |
| JP | 8-115070 | 7/1996 |
| JP | 9-319546 | 12/1997 |
| JP | 10-020844 | 1/1998 |
| JP | 11-134161 | 5/1999 |
| JP | 2000-035847 | * 2/2000 |
| JP | 2000-339130 | 12/2000 |

* cited by examiner

*Primary Examiner*—Kieu D Vu
(74) *Attorney, Agent, or Firm*—Staas & Halsey LLP

(57) ABSTRACT

The information processing apparatus displays two or more windows on a display device. The processing apparatus has a screen memory (48) for the display device (2) and a processing unit (40) for outputting image data of the specific window of the screen memory (48) to an external monitor (3). Only the picture of a window which is specified among plural windows currently displayed on the screen on the big screen of the external monitor, but an unnecessary window is not displayed. For this reason, multitasking of a computer is also realizable while being able to enjoy a big screen display enough.

9 Claims, 6 Drawing Sheets

INFORMATION PROCESSING APPARATUS, A DISPLAY CONTROL METHOD OF THE INFORMATION PROCESSING APPARATUS, A STORAGE MEDIUM AND ITS PROGRAM PERFORMING A PLURAL WINDOW DISPLAY This application is a continuing application, filed under 35 U.S.C. §111(a), of International Application PCT/JP01/01324, filed Feb. 22, 2001, it being further noted that foreign priority benefit is based upon Japanese Patent Application PCT/JP01/00175, filed.

TECHNICAL FIELD

This invention relates to an information processing apparatus which has a function for displaying a window display screen on a display device being connected outside, its display control method, its storage medium, and its program and especially to an information processing apparatus which displays a picture in a specific window on the external display device, its display control method, a storage medium, and its program.

BACKGROUND ART

The wave of low-pricing and a miniaturization of a personal computer used by individual person is remarkable according to a development of the computer. Such a personal computer is used also at a home only as a tool of an office work. For this reason, it is required that it should have a function as home electronics apparatus in the personal computer. For example, in a personal computer, it has the function that reproduces image picture disks, such as DVD, and the function to perform games, such as CD.

Pictures, such as such an image, are usually displayed on the display screen of a personal computer. However, the personal computer is developed for the purpose of small and low-pricing, and the screen size is about 15 inches from 14 inches at maximum. On the other hand, the television and the projector that are used in a home or office have the tendency of big-screen, and that of 40 inches and 50 inches has appeared.

For this reason, it is required to not only display a picture on the small screen of a personal computer, but also to display the processing picture of a personal computer on an external large-sized display device. In order to realize this, the external display connection port is provided to the personal computer, and the processing picture is displayed on large-sized television by connecting the television to this port.

This method is for display the whole display screen of a personal computer on the external display. On the other hand, a personal computer processes two or more tasks concurrently, and displays two or more each tasks on one display screen in the form of a window.

For this reason, since two or more windows are displayed on an external display when making two or more tasks run, it occurs a problem that it cannot display only one window on the external display of a big screen during multitasking execution. For example, the window screen of other unnecessary tasks is also displayed on a big-screen of a by television during multitasking execution even though wanting to enjoy the reproduction picture of DVD, Video-CD with a big-screen television.

On the contrary, in order to display only one window on a big screen display, it is necessary not to start or to end processing of other tasks, and it occurs the problem that precious multitasking and a multi-window function of the personal computer cannot be used. For example, a transmission display of E-mail or WORD processing cannot be performed during reproduction of DVD.

DISCLOSURE OF INVENTION

Therefore, it is an object of this invention to provide an information processing apparatus for displaying a desired window of a computer screen on an external display device while executing multitasking, its display control method, a storage medium, and its program.

Moreover, it is another object of this invention to provide the information processing apparatus, its display control method, a storage medium, and a program for setting up easily the window to display on an external display device.

Furthermore, it is further object of this invention to provide the information processing apparatus, its display control method, a storage medium, and a program for preventing the display of windows other than the window displayed on an external display device.

In order to perform these object, the information processing apparatus of this invention to process information and to perform two or more window displays on a display device, has a screen memory for the above-mentioned display device, and a processing unit for outputting the image data of the specific window of the above-mentioned screen memory to an external monitor.

Since the window specified among two or more windows currently displayed on the personal computer screen is displayed on an external monitor, it can display only the picture of the specified window on the big screen, thereby an unnecessary window is not displayed. For this reason, multitasking of a computer is also realizable while being able to enjoy a big screen display enough.

In this invention, it is preferable that the above-mentioned processing unit displays the selection menu of the above-mentioned external monitor output on the window of the above-mentioned display device, thereby can be easily selected an output window.

In this invention, it is preferable that the above-mentioned processing unit outputs the image data of an effective window to the above-mentioned external monitor among two or more windows of the above-mentioned display device, thereby can change an external display window by task specification of a processing unit.

In this invention, it is preferable that the processing unit displays the selection menu of two or more kinds of the above-mentioned external monitor output on the window of the above-mentioned display device, thereby the above-mentioned processing unit can choose the output mode of the external monitor that is linked or not with the change of a task.

In this invention, it is preferable, the above-mentioned processing unit starts up the display application program for the output of the above-mentioned external monitor according to starting of an operating system, thereby it can save an operator's time and effort even though providing these functions.

In this invention, it is preferable that the above-mentioned processing unit displays each window according to two or more started tasks on the display device, thereby can enjoy a big screen display enough while realizing multitasking processing.

In this invention, it is preferable that the above-mentioned processing unit executes application of reproduction of an image, thereby can realize the powerful big screen display of an image on a personal computer level.

BEST MODE FOR CARRYING OUT THE INVENTION

The embodiments of the invention will be explained according to figures below.

Figure 1:
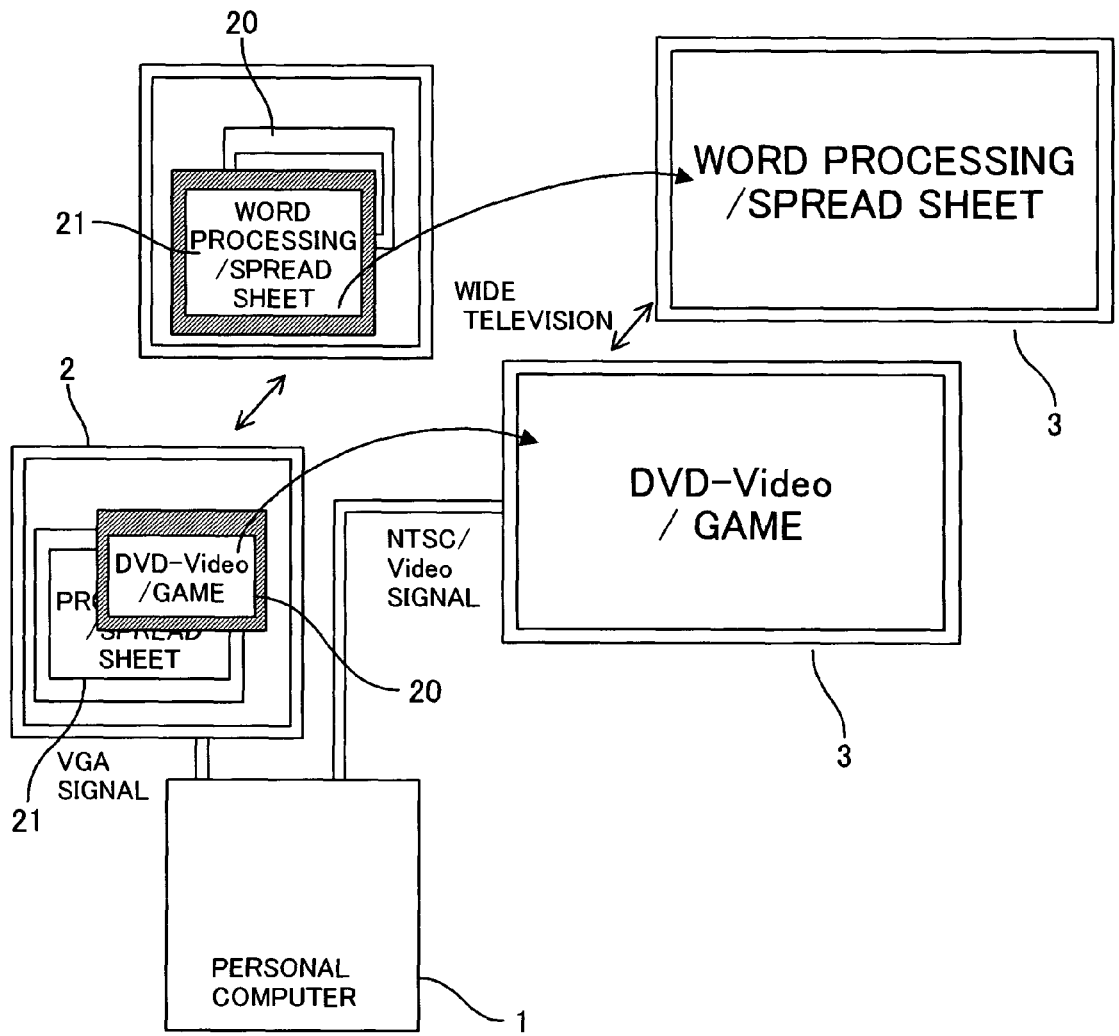
FIG. 1 shows a block diagram of the personal computer system of one embodiment of this invention.
Figure 2:
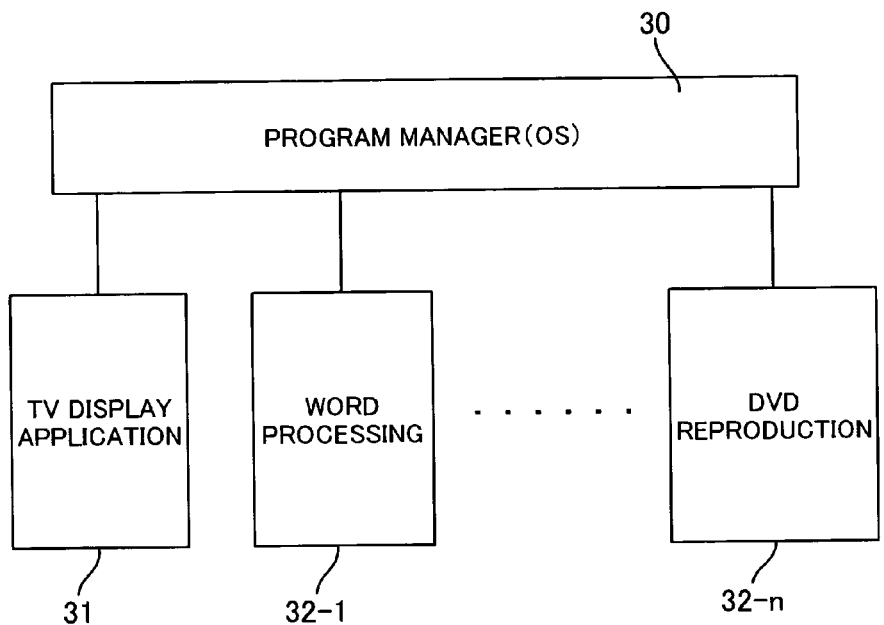
FIG. 2 shows a software composition figure of the personal computer in FIG. 1.
Figure 3:
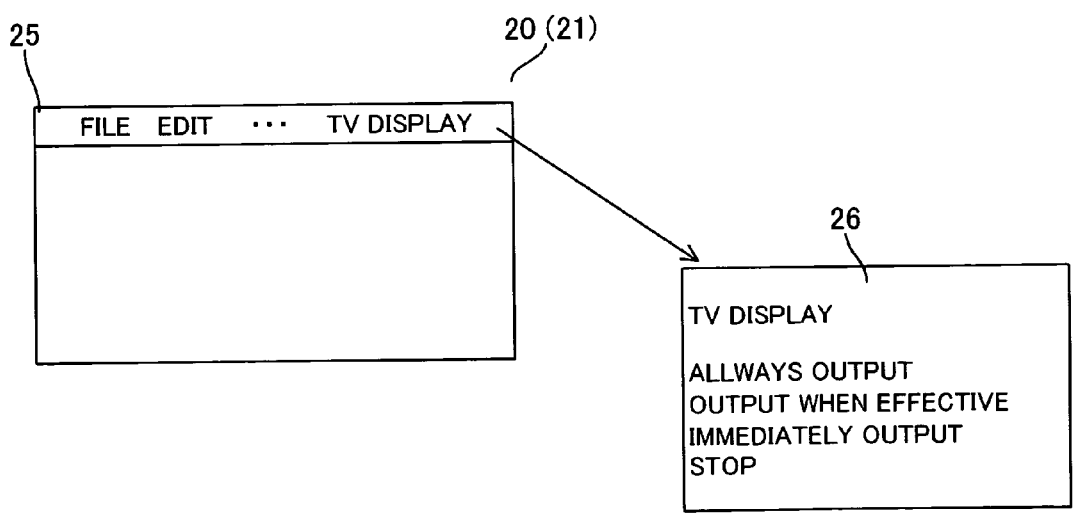
FIG. 3 shows a window screen figure of the personal computer of FIG. 1.

FIG. 1 is a block diagram of a personal computer of one embodiment of the invention, FIG. 2 shows the software composition of the personal computer of FIG. 1 and FIG. 3 shows window screen figures of FIG. 1.

FIG. 1 shows the desktop type personal computer to the example as information processing apparatus of this invention. The main part 1 of a personal computer has an information processing unit, a memory unit, a communication unit, a display control unit, etc. so that it may mention later in FIG. 4. A personal computer display device 2 is connected with the main part 1 of a personal computer, and receives the VGA signal of the main part 1 of a personal computer, and is used as a display device that displays the screen of a personal computer. The personal computer display device 2 has a 17 inches screen, for example.

A keyboard 10 is connected with the main part 1 of a personal computer by the cable or radio, and performs directions by the key. A mouse 11 is connected with the main part 1 of a personal computer by the cable or radio, and operates a pointer.

Television 3 comprises an external display which receives an NTSC signal or a video signal and displays a picture, and is constituted from the wide television which displays a wide screen by this example, for example, has a 40 inches screen.

The composition of the software (program) of the main part 1 of a personal computer consists of OS (program manager) 30 and two or more application programs 31, and 32-1 - 32-n which operates to the origin of management of OS 30, as shown in FIG. 2.

A personal computer 1 can choose and start two or more applications according to operation of the keyboard 10 and the mouse 11 after the startup of OS 30, and the processing situation of application is displayed on the personal computer display device 2. Since the display area of the personal computer display device 2 is restricted, the processing situation of each application is displayed on a display device 2 in a window. In this example, application 32-n of DVD-Video/GAME and the application of a word processor/spreadsheet 32-1 are started, and the window 20 of DVD-Video/GAME and the window 21 of a word processor/spreadsheet are displayed on the personal computer display screen.

In order to display each window on a personal computer display screen and display greatly the window which wants to operate it, an effective window to operate is displayed on a face side, and a part of other windows are exposed and displayed on the back side. In the example of FIG. 1, the window 20 of DVD-Video/GAME is displayed on a face side, and the window 21 of a word processor/spreadsheet is displayed on the back side. The face/back side relation of this window can be changed, that is, the face/back side is reversed by clicking a back window (application) by using the taskbar of a personal computer screen.

In the example of FIG. 1, if the application of the word processor/spreadsheet of a taskbar is clicked in the state where the window 20 of DVD-Video/GAME is displayed on a face side and the window 21 of a word processor/spreadsheet is displayed on the back side, the window 20 of DVD-Video/GAME is displayed on the back side, and the window 21 of a word processor/spreadsheet is displayed on the face side.

One feature of this invention is to display the window specified among two or more windows currently displayed on the personal computer screen on the big screen of the external television 3. In the example of FIG. 1, in the case of displaying the effective window on the big screen at the external television 3, in the state where the window 20 of DVD-Video/GAME is displayed on a face side, and the window 21 of a word processor/spreadsheet is displayed on the back side, the window of DVD-Video/GAME is displayed on the external television 3. Contrary, in the state where the window 20 of DVD-Video/GAME is displayed on the back side, and the window 21 of a word processor/spreadsheet is displayed on the face side, the window of a word processor/spreadsheet is displayed on the external television 3.

As shown in FIG. 2, for this reason, TV (television) display application program 31 is provided as application managed by OS 30. This TV display application 31 is started automatically after starting of OS 30, and caries out TV display control of a window, as explained in FIG. 5. And as shown in FIG. 3, the setting menu "TV display" of TV display application is displayed on the menu bar 25 of the window 20 (21) of other applications. That is, "TV display" menu is added to the menu bar 25 in addition to such as a "file", "edit", and a "tool".

When this "TV display" is clicked, the pull down menu 26 which sets up TV display is displayed, as shown in FIG. 3. This pull down menu 26 consists of a "it is always an output" menu that displays TV not concerned effectively/non-effectively, a "it is an output when effective" menu which displays by TV when a window is effective, an "it is an output immediately" menu which immediately displays by TV until the window becomes non-effective, and a "stop" menu for the stop of TV display. An operator clicks either one of the pull down menus 26, and can set up TV display conditions.

Thus, for every window, TV display application 31 sets up TV display conditions, and controls TV display for every window.

Figure 4:
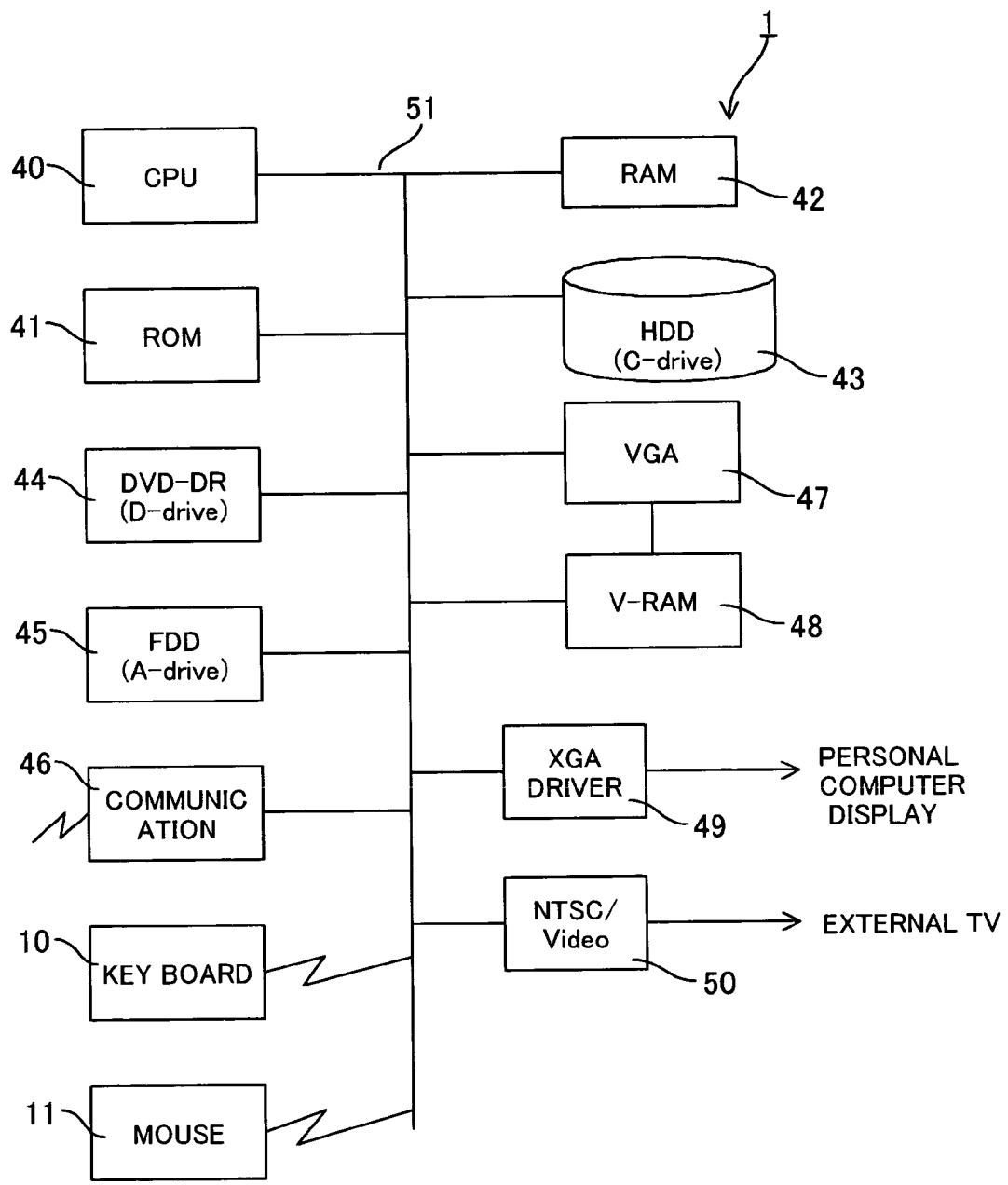
FIG. 4 shows a block diagram of the personal computer of FIG. 1.
Figure 5:
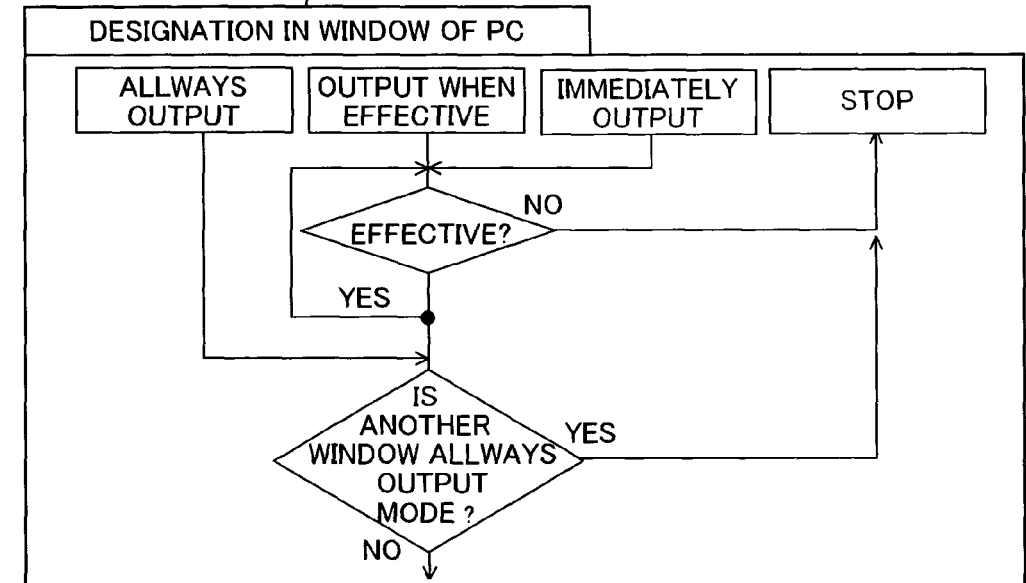
FIG. 5 shows a processing flow chart of TV display application program of FIG. 2.
Figure 5:
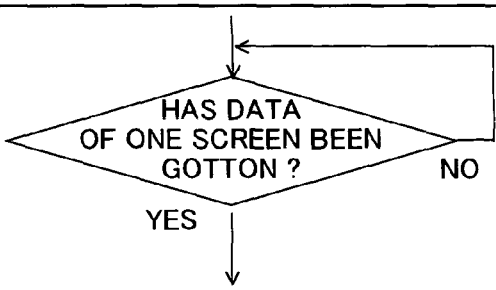

Next, FIG. 4 explains construction of the main part 1 of a personal computer, and FIG. 5 explains the processing flow of TV display application 31.

First, as shown in FIG. 4, the main part 1 of a personal computer has CPU (central processing unit) 40, ROM (read-only memory) 41, RAM (random access memory) 42, and HDD (hard disk drive) 43 as a processing unit.

The CPU 40 is a processor that executes data processing, and can be used the Pentium processor of Intel, K series processor of AMD, etc. The ROM 41 is a read-only memory for storing a fixed program and data, etc. required for processing. The RAM 42 memorizes the data under data processing of CPU 40 temporarily. The HDD 43 is a mass storage device, and stores a program and data, and, in this invention, OS 30, such as Windows, TV display application 31, other applications 32-1 - 32-n are installed in HDD 43.

The optical disk drive (DVD-DR) 44 consists of disk drive that reads DVD. Image software is memorized by this DVD. FDD 45 is a drive that performs reading/writing of FD (Floppy Disk). The communication unit 46 communicates with other apparatus and a network, and consists of a modem, a LAN card, a radio-communications board, etc.

VGA (Video Graphic Array) 47 consists of processors only for pictures, and performs drawing processing etc. V-RAM (Video Random Access Memory) 48 is RAM for personal computer screen memories, and is written the image of a screen in by VGA 47. The XGA driver 49 reads the screen memory of V-RAM 48, and outputs an XGA signal to the personal computer display device 2.

The NTSC/Video conversion circuit 50 converts the image data of a screen memory to an NTSC signal, and outputs it to the external television 3. A bus 51 connects these units and exchanges a command, data, etc.

Next, FIG. 5 explains TV display application program of FIG. 2.

(S10) OS 30 is started and TV display application 31 is started.

(S11) An operator chooses required application with a keyboard and a mouse, and starts application. For example, when DVD reproduction application 32-n is started, DVD is read by DVD-DR 44, image data is written in V-RAM 48 by XGA 47, and the XGA driver 49 converts image data into an XGA signal, and outputs to the personal computer display device 2. At this time, the image of DVD is displayed in the window that is set up in the personal computer screen. As shown in FIG. 3, TV display menu is displayed on this window. If needed, an operator clicks TV display menu, and opens a pull down menu 26, and can choose an "it is always an output" menu, "it being an output when effective", an "it is an output immediately" menu, or a "stop" menu.

CPU 40 checks the TV display conditions of a window. When "it is always an output" is specified, it is judged whether or not "it is always an output" is specified in other window. And when "it is always an output" is not specified in other windows, it progresses to Step S12. On the contrary, when "it is always an output" is specified in other windows, the display conditions are replaced to TV output stop, and TV output is not performed.

Similarly, when "it being an output when effective", or "it is an output immediately" are specified, it is judged whether or not the window is effective. An effective window is an active window and is a window displayed on the top face of a personal computer screen. If it is an effective window, it is judged whether or not "it is always an output" is specified in other windows. And "it is always an output" is not specified in other windows, it progresses to Step S12. On the contrary, when it is not an effective window, or when "it is always an output" is specified in other windows, the display conditions are replaced to TV output stop, and TV output is not performed. TV output is suspended when "the stop" is specified.

(S12) CPU 40 acquires the image data in a window. That is, the image data for one screen in the window concerned of the screen memory of V-RAM 48 is read, and it expands if needed, and sends out to the NTSC/Video conversion circuit 50.

(S13) The NTSC/Video conversion circuit 50 converts this image data into an NTSC signal, and outputs it to the external television 3. The external television 3 displays this.

Figure 6:
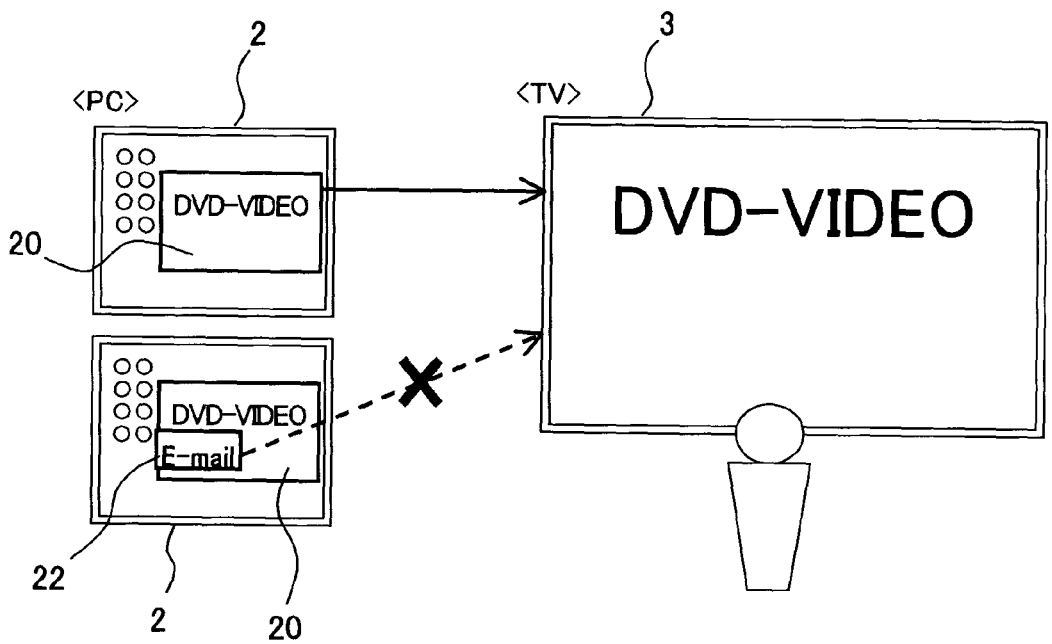
FIG. 6 shows a diagram of the example of a display of TV display application of FIG. 5.
Figure 8:
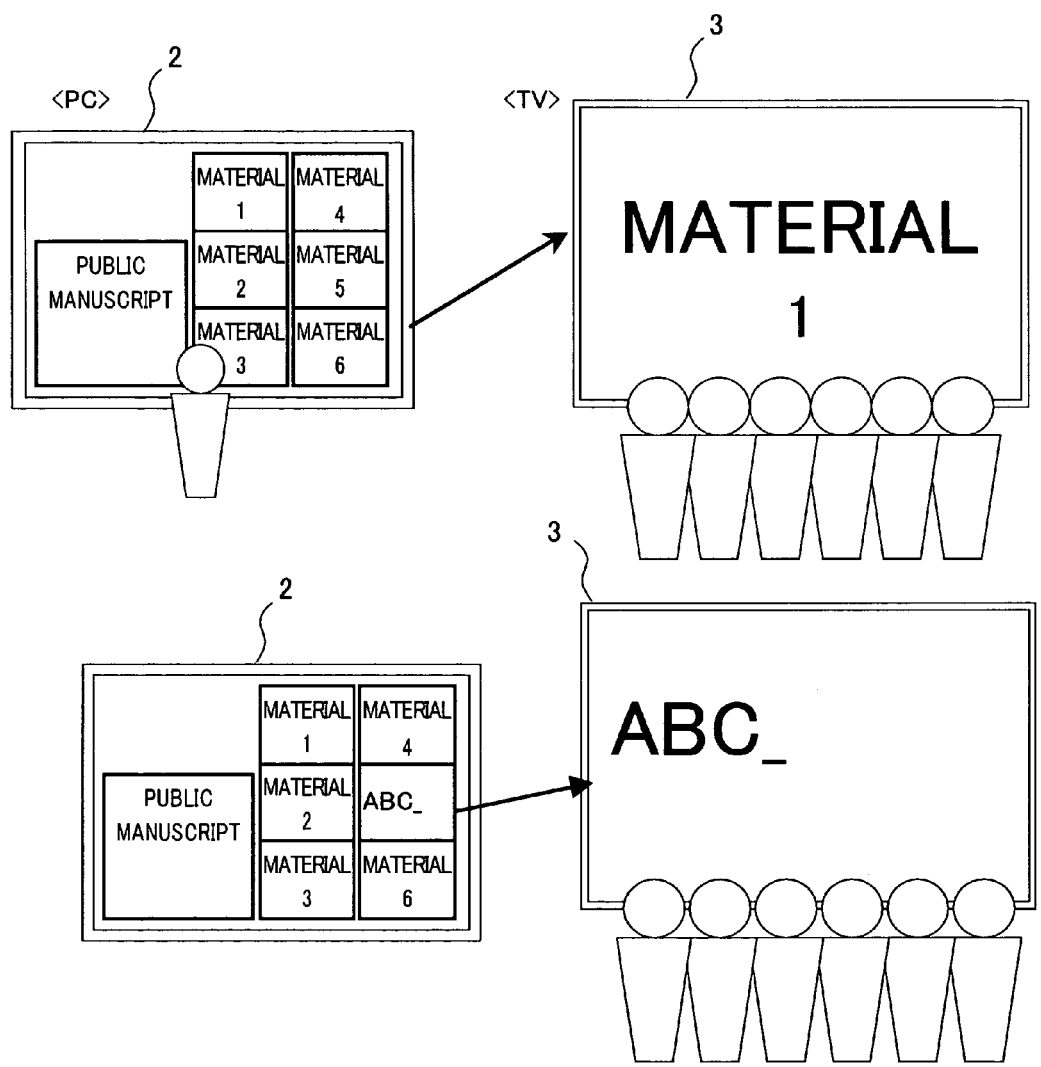
FIG. 8 shows a diagram of further example of a display of TV display application of FIG. 5.

Thus, the picture of the appointed window of the personal computer screen 2 can be changed into a television signal, and it can express as the external television 3. FIG. 6 or 8 is the example of a display.

As shown in FIG. 6, DVD reproduction application is started and a DVD picture is displayed on the personal computer display device 2. Furthermore, the DVD picture of the window 20 is displayed on the external television 3 by specifying TV output with the above-mentioned TV display menu to enjoy a DVD picture by the big screen.

When E-mail transmits or receives in the meantime, even if the window 22 of E-mail opens with an effective window, the DVD picture display of a window 20 is continued by the external television 3 by always specifying the window 20 of DVD to be an output. In the meantime, a personal computer operator can perform check of reception E-mail, and transmission. For this reason, while being able to enjoy the DVD picture using the personal computer, other applications of a personal computer can be used simultaneously.

Figure 7:
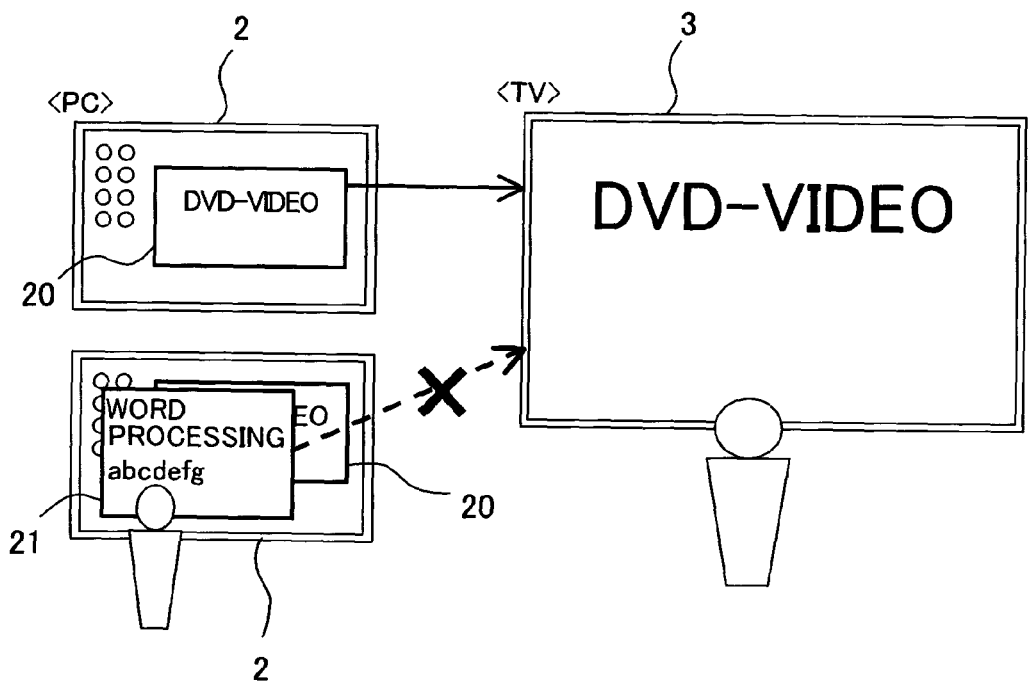
FIG. 7 shows a diagram of other examples of a display of TV display application of FIG. 5.

In the example shown in FIG. 7, DVD reproduction application is started and a DVD picture is displayed on the personal computer display 2. Furthermore, the DVD picture of the window 20 is displayed on the external television 3 by specifying TV output with the above-mentioned TV display menu to enjoy a DVD picture by the big screen.

Even if the application of a word processor starts and the window 21 opens as an effective window in the meantime at the time of word processor operation, the DVD picture display of a window 20 is continued by the external television 3 by always specifying the window 20 of DVD to be an output. In the meantime, a personal computer operator can operate a word processor.

For this reason, while being able to enjoy the DVD picture that uses the personal computer by a lot of people, an operator can use other applications of a personal computer simultaneously, if necessary. And since an unnecessary window is not displayed on the television 3, the big screen picture of television can be enjoyed fully.

FIG. 8 is the example of use of the presentation using a personal computer and a television. A personal computer operator (presenter) displays an announcement manuscript and its data 1-6 side by side in each window of the personal computer screen, and chose the TV display menu of the window, thereby can be displaying the specified window on the external television 3. The auditor who watches the external television 3 is seen only in a presenter's required data, and, on the other hand, a presenter can see the whole data. For this reason, the presentation of the contents of an announcement can be carried out smoothly. This example indicates the effective window by priority like the example of FIG. 1.

In the above case of the operation, although the combination of image reproduction processing and other processing explained, it is applicable also to the combination of the processing which does not include image processing like combination, such as word processor processing and E-mail processing, for example.

Moreover, as image software, although DVD is explained, CDs (Compact Disk) etc. may be other image software and TV receiving contents.

Furthermore, although television is explained as the external display, an image projector and a digital display device can be used.

Although the example for automatically starting TV display application by starting of OS is explained, it can be started by an operator's selection, and the setting kind of TV display conditions can also be decreased or increased if needed.

Moreover, in order to raise display resolution, the reproduction picture of DVD may be converted into NTSC as it is and is displayed on external television.

Although the desktop computer explained, it is applicable also to a notebook PC and a mobile personal computer.

As mentioned above, although this invention is explained by the embodiments, within the limits of the technical meaning of this invention, various modifications are possible for this invention, and it does not eliminate these from the technical range of this invention.

INDUSTRIAL APPLICABILITY

Since the screen memory for the availability display and the processing unit for outputting the image data of the specific window of the above-mentioned screen memory to an external monitor are provided, only the picture of a specified window among two or more windows currently displayed on the screen can be displayed on the external monitor. Therefore, only the specified window is displayed on the big screen, but an unnecessary window is not displayed. For this reason, multitasking of a computer is also realizable while being able to enjoy a big screen display enough.

What is claimed is:

1. An information processing apparatus processing information and displaying plural windows on a display device, comprising:
    a screen memory for the display device; and
    a processing unit outputting image data of a specific window of the screen memory to an external monitor;
    wherein said processing unit executes plural tasks being started, displays the plural windows according to said plural tasks on said display device, and displays an external monitor output selection menu with a plurality of output modes in a menu bar of each of the plural windows, to select whether said image data of said window is output to said external monitor by said processing unit to be displayed, wherein said external monitor output menu includes an item that indicates that the image data of the window is always output to said external monitor, and an item that indicates that the image data of the window is output to said external monitor when effective on the display device, and
    wherein, for each of the plural windows, said processing unit checks which item of the external monitor output selection menu corresponding to the window is selected, and outputs the image data of the selected window to said external monitor according to a result of checking.

2. The information processing apparatus according to claim 1, wherein said processing unit outputs image data of a single effective window among the plural windows displayed on the display device to the external monitor.

3. The information processing apparatus according to claim 1, wherein said processing unit starts up a display application program whose corresponding window for the is output to said external monitor according to starting of an operating system.

4. The information processing apparatus according to claim 1, wherein said processing unit executes an application for reproducing an image.

5. A method of controlling a display device, comprising:
    executing plural tasks;
    displaying plural windows of each of said tasks on said display device; and
    outputting image data of a selected window among said plural windows to an external monitor,
    wherein said displaying comprises displaying an external monitor output selection menu in a menu bar of each window of the display device to select whether image data of said window is output to said external monitor, the selection menus being displayed with a plurality of output modes and including an item that indicates that the image data of the window is always output to said external monitor, and an item that indicates that the image data of the respective window is output to said external monitor when effective on the display device, and
    said outputting includes checking which item of the external monitor output selection menu corresponding to the window is selected, and outputting the image data of the selected window to said external monitor according to a result of the checking.

6. The method according to claim 5, wherein said outputting comprises outputting the image data of an effective window among plural windows of the display device according to an item of said selection menu to the external monitor.

7. The method according to claim 5, further comprising starting a display application program whose corresponding window is output to the external monitor according to starting of an operating of an information processing apparatus.

8. The method according to claim 5, wherein said displaying comprises displaying a reproduction image on said selected window.

9. A computer-readable storage medium storing a program for a display device causing a computer to execute:
    displaying plural windows of each executed tasks on said display device; and
    outputting image data of a selected window monitor among said plural windows, to an external monitor,
    wherein said displaying comprises displaying an external monitor output selection menu in a menu bar of each window of the display device to select whether image data of said window is output to said external monitor to be displayed, the selection menus being displayed with a plurality of output modes, and including an item that indicates that the image data of the window is always output to said external monitor, and an item that indicates that the image data of the respective window is output to said external monitor when effective on the display device, and
    said outputting includes checking which item of the external monitor output selection menu corresponding to the window is selected, and outputting the image data of the selected window to said external monitor according to a result of the checking.

* * * * *

UNITED STATES PATENT AND TRADEMARK OFFICE
CERTIFICATE OF CORRECTION

| | | |
|---|---|---|
| PATENT NO. | : 7,523,402 B2 | Page 1 of 1 |
| APPLICATION NO. | : 10/644006 | |
| DATED | : April 21, 2009 | |
| INVENTOR(S) | : Haruyuki Kunisada | |

It is certified that error appears in the above-identified patent and that said Letters Patent is hereby corrected as shown below:

Title page, Column 1 (Title), Line 4, change "PROGRAM" to --PROGRAM,--.

Column 1 (Title), Line 4, change "PROGRAM" to --PROGRAM,--.

Column 7, Line 57, after "window" delete "for the".

Signed and Sealed this

Eighteenth Day of August, 2009

David J. Kappos
*Director of the United States Patent and Trademark Office*